United States Patent [19]

Ylitervo

[11] Patent Number: 5,764,632
[45] Date of Patent: Jun. 9, 1998

[54] MOBILE TERMINAL HAVING IMPROVED PAGING CHANNEL ACQUISITION IN A SYSTEM USING A DIGITAL CONTROL CHANNEL

[75] Inventor: Matti Ylitervo, Oulu, Finland

[73] Assignee: Nokia Mobile Phones Limited, Salo, Finland

[21] Appl. No.: 625,551

[22] Filed: Apr. 1, 1996

[51] Int. Cl.$^6$ ............................. H04B 7/212; H04Q 7/32
[52] U.S. Cl. ............................. 370/337; 370/347; 370/478
[58] Field of Search ............................. 370/280, 311, 370/328, 336, 337, 345, 347, 498, 522, 524, 528, 915, 503; 371/2.1, 67.1, 53, 48

[56] References Cited

U.S. PATENT DOCUMENTS

| | | | |
|---|---|---|---|
| 5,276,691 | 1/1994 | Kivari | 371/47.1 |
| 5,404,355 | 4/1995 | Raith | 370/95.1 |
| 5,606,548 | 2/1997 | Vayrynen | 370/252 |
| 5,625,629 | 4/1997 | Wenk | 370/347 |

Primary Examiner—Douglas W. Olms
Assistant Examiner—Matthew C. Phillips
Attorney, Agent, or Firm—Perman & Green, LLP

[57] ABSTRACT

A wireless user terminal (10), such as a cellular telephone, is of a type that receives a forward digital control channel that is comprised of a plurality of continuously transmitted frames, comprised of time slots, which are logically organized into Superframes contained within Hyperframes. A method includes the steps of (a) receiving and storing a first SPACH slot from a first Hyperframe; (b) receiving and storing at least a F-BCCH slot from a second, next Hyperframe; (c) receiving a second SPACH slot from the second, next Hyperframe; (d) decoding the stored first SPACH slot and the second SPACH slot and calculating a CRC of each decoded SPACH slot using DVCC information contained within the received F-BCCH slot; and (e) comparing a state of a BCN flag in the first SPACH slot to the state of the BCN flag in the second SPACH slot and, if they are equal, declaring that the received and stored F-BCCH slot is valid.

7 Claims, 4 Drawing Sheets

MOBILE TERMINAL HAVING IMPROVED PAGING CHANNEL ACQUISITION IN A SYSTEM USING A DIGITAL CONTROL CHANNEL

FIELD OF THE INVENTION:

This invention relates generally to radiotelephones and, in particular, to mobile terminals such as those capable of operation with a cellular network.

BACKGROUND OF THE INVENTION:

In one type of modern cellular communications system a mobile station or terminal bidirectionally communicates with a Base Station (BS), Mobile Switching Center (MSC) and Interworking Function, referred to collectively as the BMI. In this system, referred to in the art as IS-136, it is possible for the mobile terminal to use digital traffic and control channels which are organized in a time division duplex (TDM) format with a slotted frame structure. The slotted frames are further organized into a logical structure comprised of repeating Superframes and Hyperframes.

Referring to FIG. 1A, each Superframe (SF) on a Forward Digital Control Channel (F-DCCH) is comprised of an ordered sequence of logical channels. The possible numbers of slots that can be supported for each logical channel is illustrated in FIG. 1B. These slots include Fast Broadcast Control Channel (F-BCCH) slots, Extended Broadcast Control Channel (E-BCCH) slots, Short Message Service-Broadcast Control Channel (S-BCCH) slots, and Short Message Service (SMS) Point-to-Point, Paging and Access Response (SPACH) slots. The SPACH slots can be Paging Channel (PCH), Access Response Channel (ARCH), or Short Message Service Point-to-Point Channel (SMSCH) slots.

More particularly, the Short Message Service (SMS) Point-to-Point, Paging and Access Response Channel (SPACH) is a logical channel used to broadcast information to specific mobile terminals regarding SMS Point-to-Point (SMSCH) and paging (PCH), and to provide an access response channel (ARCH) as described below. The SPACH may thus be considered to be subdivided into the three logical channels SMSCH, ARCH and PCH.

The PCH is a logical channel subset of the SPACH dedicated to delivering pages and orders. The ARCH is a logical channel subset of the SPACH to which the mobile terminal autonomously moves upon successful completion of a contention or reservation based access on a Random Access Control Channel (RACH). The ARCH may be used to convey assignments to another resource or other responses to the mobile terminal access attempt. The SMSCH is a logical channel used to deliver Teleservice-related messages to a specific mobile terminal.

A Superframe Phase (SFP) increments every TDMA block. The SFP starts at 0 on the first F-BCCH slot and counts modulo 32. For a half-rate DCCH only slots with even SFP numbers are used.

The first slot in a SF (SFP=0) is allocated to the first FBCCH slot. If more than one DCCH is allocated on a given frequency, the start of the SFs occur in the same TDMA block (i.e., SF synchronization is required).

As is illustrated in FIG. 2, a Hyperframe (HF) consists of two Superframes, with one Superframe being designated as primary and the other designated as secondary. Every Paging Channel (PCH) in the primary Superframe is always repeated in the secondary Superframe. Normally, for power saving reasons, the mobile terminal receives only the primary Superframe. The SPACH information (described below) excluding PCH information, may be different from SF to SF.

The F-BCCH carries the same information in every primary and secondary Superframe on a given Digital Control Channel (DCCH). The Extended Broadcast Control Channel (E-BCCH) information may be different from SF to SF, as the information repeats after a certain period.

It should be noted that any change in the Fast Broadcast Control Channel (F-BCCH) or the E-BCCH information elements, except those indicated as non-critical, take effect in the next Hyperframe. If a change occurs, notification is provided by transitioning a Broadcast Channel Change Notification (BCN) flag in all SPACH slots in the preceding Hyperframe (see IS-136, Rev. A. section 5.2.5 "SPACH Protocol", and in particular FIG. 5–23 "SPACH Header A").

The F-BCCH includes an E-BCCH change flag (EC), which transitions to indicate if the E-BCCH information has changed beginning with the current Hyperframe. The F-BCCH also includes an F-BCCH change flag (FC), which transitions to indicate if the F-BCCH information has changed beginning with the current Hyperframe.

The above-mentioned BCN flag is a toggle flag, i.e., it changes state (0 to 1 or 1 to 0) to indicate a change in the F-BCCH and E-BCCH information elements. As such, a knowledge of the state of the BCN in any given SPACH slot is not sufficient to determine if a change is to occur in the F-BCCH or E-BCCH in the next Hyperframe. That is, two successively transmitted BCN flags from successive Hyperframes are required to be received and analyzed in order to determine if a change of state in the BCN has occurred, the change of state indicating a change in at least one of the F-BCCH and E-BCCH. Having detected a change of state in the BCN flag, the EC and FC flags (also toggle flags) must then be examined to determine whether one or both of the F-BCCH and E-BCCH has changed.

Since a Hyperframe has a duration of approximately 1.2 seconds, and since a plurality of Hyperframes must be received in order to detect a change of state of the BCN flag, it can be appreciated that an undesirable userperceptible delay can occur when the mobile terminal first acquires the DCCH. That is, two consecutive Hyperframes must be received and the BCN flags compared to determine if the mobile terminal has the latest information transmitted from the BMI.

OBJECTS OF THE INVENTION:

It is thus a first object of this invention to provide an improved method for updating valid F-BCCH and E-BCCH information in a mobile terminal.

It is a further object of this invention to provide a method to increase the speed at which a mobile terminal is enabled to validate the F-BCCH and E-BCCH information transmitted by the BMI.

SUMMARY OF THE INVENTION

The foregoing and other problems are overcome and the objects of the invention are realized by methods and apparatus in accordance with embodiments of this invention. A method of this invention is disclosed for operating a wireless mobile or user terminal to acquire access to a wireless system. Also disclosed is a wireless user terminal that operates in accordance with the method. The wireless user terminal, such as a cellular telephone, is of a type that receives a forward digital control channel that is comprised of a plurality of continuously transmitted frames, comprised of time slots, which are logically organized into Superframes contained within Hyperframes.

The method includes the steps of (a) receiving and storing a first SPACH slot from a first Hyperframe; (b) receiving and storing at least a F-BCCH slot from a second, next Hyperframe; (c) receiving a second SPACH slot from the second, next Hyperframe; (d) decoding the stored first SPACH slot and the second SPACH slot and calculating a CRC of each decoded SPACH slot using DVCC information contained within the received F-BCCH slot; and (e) comparing a state of a BCN flag in the first SPACH slot to the state of the BCN flag in the second SPACH slot and, if they are equal, declaring that the received and stored F-BCCH slot is valid.

Preferably, the first SPACH slot is a second to last SPACH slot of a Superframe. The second to, last Superframe slot is guaranteed to also be a SPACH slot, regardless of the number of SPACH slots and regardless of whether the channel is a full-rate or a half-rate channel.

The step of receiving and storing at least a F-BCCH slot from a second, next Hyperframe also includes a step of receiving and storing an E-BCCH slot from the second, next Hyperframe. The step of declaring thus also declares that the received and stored E-BCCH slot is valid.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figures 1A, 1B, 2:
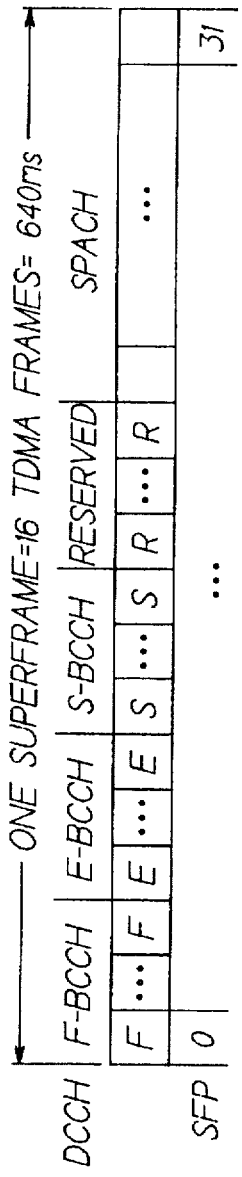
FIGS. 1A and 1B illustrate a conventional Superframe format and possible numbers of logical channels within a Superframe.
FIG. 2 illustrates a conventional Hyperframe format.
Figure 3:
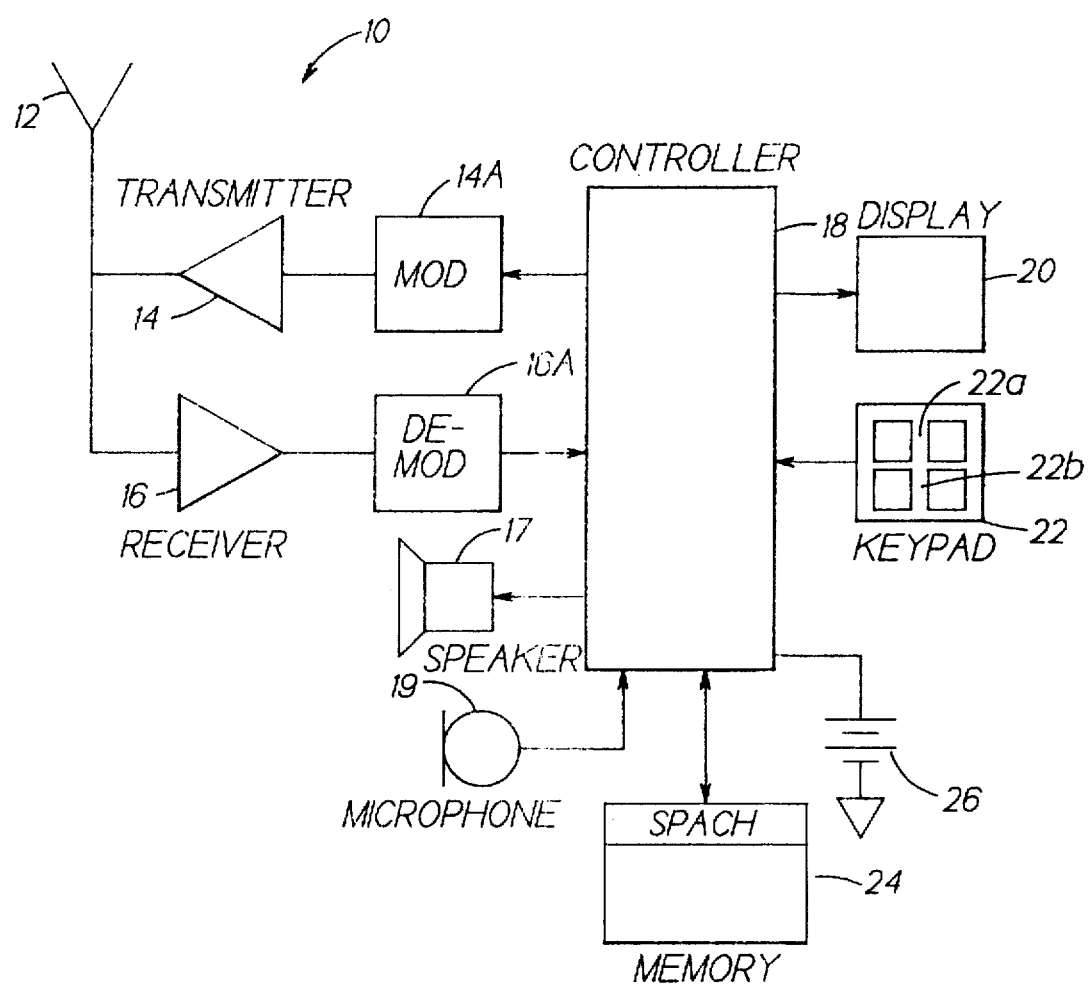
FIG. 3 is a block diagram of a mobile terminal that is constructed and operated in accordance with this invention.
Figure 4:
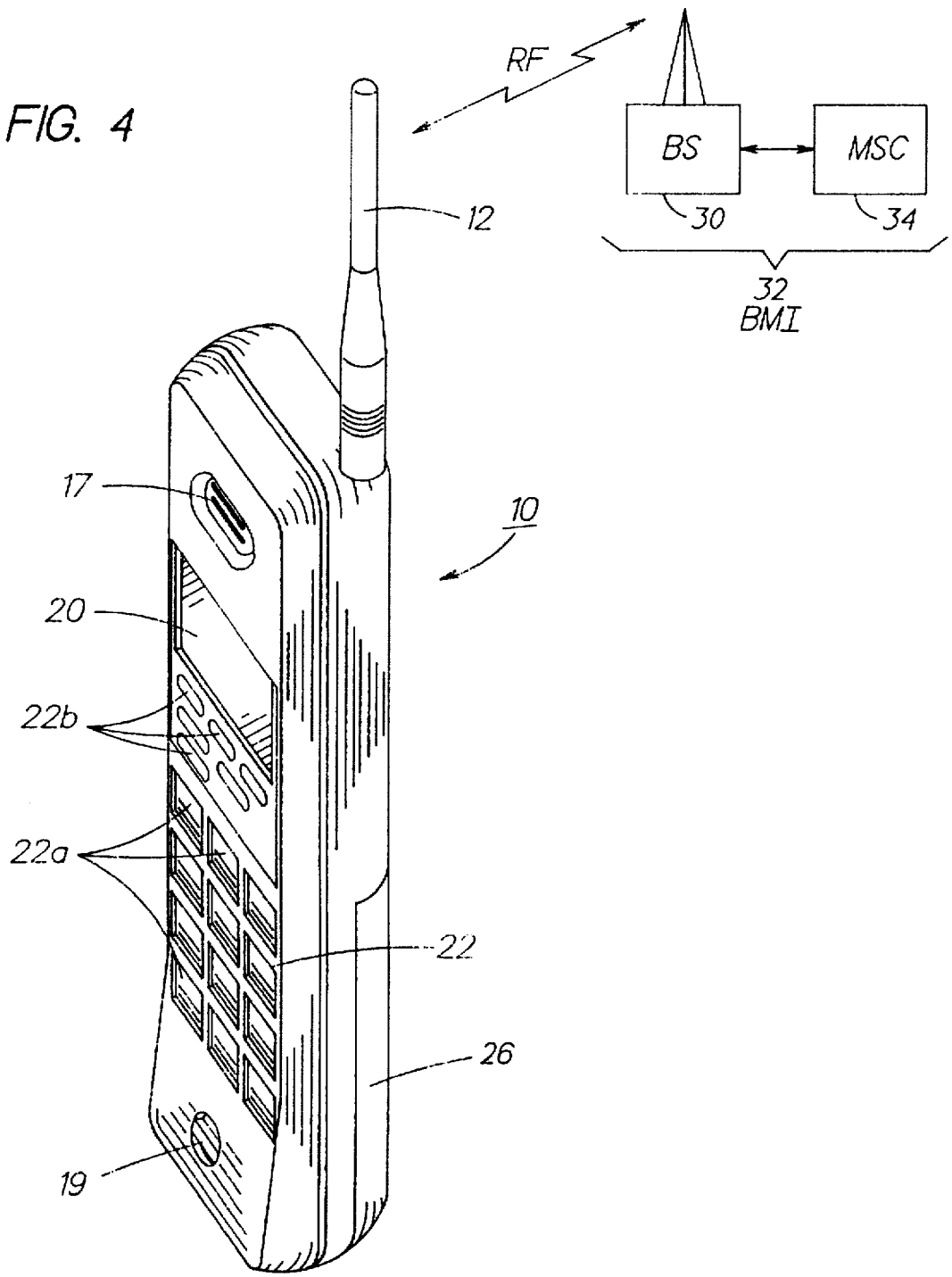
FIG. 4 is an elevational view of the mobile terminal shown in FIG. 3, and which further illustrates a cellular communication system to which the mobile terminal is bidirectionally coupled through wireless RF links.

Reference is made to FIGS. 3 and 4 for illustrating a wireless user or mobile terminal 10, such as but not limited to a cellular radiotelephone, that is suitable for practicing this invention. The mobile terminal 10 includes an antenna 12 for transmitting signals to and for receiving signals from a base site or base station 30. The base station 30 is a part of a cellular network comprising the BMI 32 that includes a Mobile Switching Center (MSC) 34. The MSC 34 provides a connection to landline trunks when the mobile terminal 10 is registered with the network.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively.

These signals include signalling information in accordance with the air interface standard of the applicable cellular system, and also user speech and/or user generated data. The air interface standard is assumed for this invention to include a physical and logical frame structure of a type that was described above, although the teaching of this invention is not intended to be limited only to this specific structure, or for use only with an IS-136 compatible mobile terminal, or for use only in TDM type systems.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile terminal 10. These other keys 22b may include, by example, a SEND key, various menu scrolling and soft keys, and a PWR key.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The mobile terminal 10 also includes a battery 26 for powering the various circuits that are required to operate the terminal.

It should be understood that the mobile terminal 10 can be a vehicle mounted or a handheld device. It should further be appreciated that the mobile terminal 10 can be capable of operating with one or more air interface standards, modulation types, and access types. By example, the mobile terminal may be capable of operating with any of a number of other standards besides IS-136 (DAMPS), such as GSM and IS-95 (CDMA). Narrow-band AMPS (NAMPS), as well as TACS, mobile terminals may also benefit from the teaching of this invention. It should thus be clear that the teaching of this invention is not to be construed to be limited to any one particular type of mobile terminal or air interface standard.

The operating program in the memory 24 includes routines to present messages and message-related functions to the user on the display 20, typically as various menu items. The memory 24 also includes routines for implementing the method described below in relation to FIGS. 5 and 6.

Figure 5:
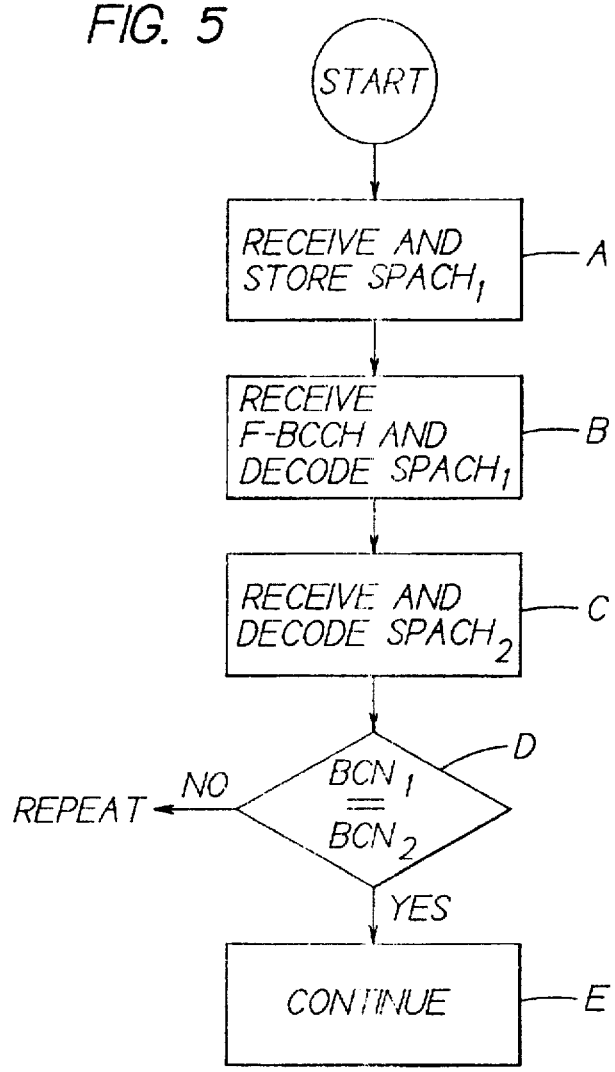
FIG. 5 is a logic flow diagram that illustrate a method executed by the mobile terminal shown in FIGS. 3 and 4.
Figure 6:
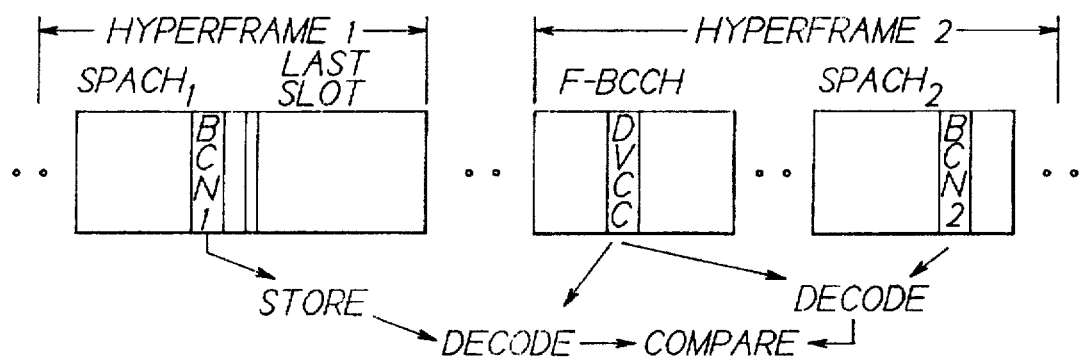
FIG. 6 illustrates various received slots and the relationships between these slots, and is useful in understanding the flowchart of FIG. 5.

Reference is now made to FIGS. 5 and 6 for illustrating a method in accordance with this invention. At Block A it is assumed that the mobile terminal 10 has tuned to a forward control channel and is initiating the acquisition of the system. In Block A the mobile terminal 10 receives and stores in the memory 24 one SPACH slot. The Superframe Phase (CSFP) field can be employed to identify the location of the SPACH slot within a Superframe. Preferably the SPACH slot, referred to hereinafter as $SPACH_1$, is the second to last slot of the Superframe. This is so because the second to last slot is always guaranteed to be a SPACH slot regardless of the number of SPACH slots contained within the Superframe and regardless of whether the DCCH is a full-rate or a half-rate channel. The stored $SPACH_1$ includes the above-described BCN toggle flag, referred to hereinafter as $BCN_1$.

At Block B the mobile terminal 10 receives and stores at least one (i.e., the first) and possibly all F-BCCH (and also the E-BCCH) slots from the next Hyperframe. As is indicated in IS-136.1, Rev. A, Section 6.4.1.1.1.1, the first F-BCCH slot includes a Digital Verification Color Code (DVCC) which, in Section 5.2.6, is specified for use when calculating the CRC of a decoded slot. The DVCC of the received F-BCCH is thus used when decoding the stored $SPACH_1$ to extract the $BCN_1$ flag therefrom.

Of course, if the calculated CRC indicates that the first SPACH was erroneously received, then the stored SPACH is discarded and another SPACH must be received. If this occurs then the advantages provided by the invention may not be realized.

At Block C the mobile terminal 10 receives (and also possibly stores) and decodes a second SPACH slot from the second Hyperframe (Hyperframe 2), referred to hereinafter as $SPACH_2$. The second SPACH slot may be again the second to last SPACH slot, or it may be the first, or any other, SPACH slot as determined from the received F-BCCH. The FBCCH is preferably decoded prior to the second SPACH slot.

It should be noted that when decoding the F-BCCH that a DVCC value of zero is preferably used, because it is not yet known what DVCC is to be used for SPACH decoding.

At Block D the mobile terminal 10 extracts the BCN flag ($BCN_2$) from $SPACH_2$ and compares same to $BCN_1$. If they are equal the mobile terminal 10 is informed that the stored FBCCH and E-BCCH information in the second Hyperframe (Hyperframe 2) is valid and current. The mobile terminal 10 then continues with system acquisition at Block E.

If the result of the comparison at Block D shows that the BCN flags are not equal a further SPACH slot in a next Hyperframe must be acquired in order to determine the valid F-BCCH and E-BCCH information.

It can be appreciated that by not waiting to first receive the F-BCCH and E-BCCH slots from a Hyperframe, before beginning the reception of SPACH slots, the mobile terminal is enabled to more quickly determine if the received F-BCCH and E-BCCH information is valid. At least 1.2 seconds (i.e., the duration of one Hyperframe) can be saved when acquiring the forward digital control channel, thereby leading to an improvement in registration time and access to the cellular system by the user.

Although described in the context of preferred embodiments, it should be realized that a number of modifications to these teachings may occur to one skilled in the art. By example, the $SPACH_1$ can be decoded after the $SPACH_2$ is received, and need not be decoded before. Furthermore, in some systems the BCN or an equivalent flag could be toggled between successive Hyperframes for indicating that no change in the F-BCCH and/or E-BCCH (or equivalent) slots has occurred, and not toggled when a change does occur. In this case only the logic of Block D of FIG. 5 need be changed to test for inequality instead of equality, with the method in all other aspects being the same.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless user terminal of a type that receives a forward digital control channel, comprising the steps of:

synchronizing to the forward digital control channel during a first frame structure of the forward control channel;

receiving and storing a first, first type of control slot from the first frame structure of the forward digital control channel, the received first, first type of control slot being stored without decoding the first, first type of control slot;

receiving and storing at least one second type of control slot from a second, next frame structure of the forward digital control channel;

receiving a second, first type of control slot from the second, next frame structure of the forward digital control channel;

decoding the stored first, first type of control slot and the received second, first type of control slot using information contained within the at least one received and stored second type of control slot; and comparing information in the decoded first and second, first type of control slots to determine if the at least one received and stored second type of control slot contains valid information.

2. A wireless user terminal of a type that receives a forward digital control channel, comprising a receiver coupled to a controller and a memory for synchronizing to the forward digital control channel during a first frame structure of the forward control channel and for receiving and storing a first, first type of control slot from the first frame structure of the forward digital control channel, the received first, first type of control slot being stored in said memory without decoding the first, first type of control slot, said receiver, controller and memory further being operable for receiving and storing at least one second type of control slot from a second, next frame structure of the forward digital control channel, and for receiving a second, first type of control slot from the second, next frame structure of the forward digital control channel, said controller comprising means for decoding the stored first, first type of control slot and the received second, first type of control slot using information contained within the at least one received and stored second type of control slot, and further comprising means for comparing information in the decoded first and second, first type of control slots to determine if the at least one received and stored second type of control slot contains valid information.

3. A method for operating a wireless user terminal to acquire access to a wireless system, the wireless user terminal being of a type that receives a forward digital control channel that is comprised of a plurality of continuously transmitted frames, comprised of time slots, which are logically organized into Superframes contained within Hyperframes, comprising the steps of:

synchronizing to the forward digital control channel during a first Hyperframe;

receiving and storing a first SPACH slot from the first Hyperframe, the received first SPACH slot being stored without decoding the first SPACH slot;

receiving and storing at least one F-BCCH slot from a second, next Hyperframe;

receiving a second SPACH slot from the second, next Hyperframe;

decoding the stored first SPACH slot and the second SPACH slot and calculating a CRC of each decoded SPACH slot using DVCC information contained within the received F-BCCH slot; and comparing a state of a BCN flag in the first SPACH slot to the state of the BCN flag in the second SPACH slot and, if they are equal, declaring that the received and stored F-BCCH slot is valid.

4. A method as set forth in claim 3, wherein the first SPACH slot is a second to last slot of a Superframe.

5. A method as set forth in claim 3, wherein the step of receiving and storing at least a F-BCCH slot from a second, next Hyperframe also includes a step of receiving and storing an E-BCCH slot from the second, next Hyperframe, and wherein the step of declaring also declares that the received and stored E-BCCH slot is valid.

6. A method for operating a wireless user terminal to acquire access to a wireless system, the wireless user terminal being of a type that receives a forward digital control channel that is comprised of a plurality of continuously transmitted frames, comprised of time slots, which are logically organized into Superframes contained within Hyperframes, comprising the steps of:

synchronizing to the forward digital control channel;

receiving and storing a first SPACH slot from a current Hyperframe, the received first SPACH slot being stored without first decoding the first SPACH slot;

receiving and storing at least one F-BCCH slot and at least one E-BCCH slot from a next Hyperframe that follows the current Hyperframe;

receiving a second SPACH slot from the next Hyperframe;

decoding the stored first SPACH slot and the second SPACH slot and calculating a CRC of each decoded SPACH slot using DVCC information contained within the received and stored F-BCCH slot; and comparing a state of a BCN flag in the decoded first SPACH slot to the state of the BCN flag in the decoded second SPACH slot and, if they are equal, declaring that the received and stored at least one F-BCCH slot is valid and that the received and stored at least one E-BCCH slot is valid, else if the step of comparing the state of the BCN flag in the decoded first SPACH slot to the state of the BCN flag in the decoded second SPACH slot indicates that they are not equal, the method includes further steps of receiving and decoding a further Hyperframe in order to obtain a valid F-BCCH slot and E-BCCH slot.

7. A method as set forth in claim 6, wherein the first SPACH slot is a second to last slot of a Superframe.

* * * * *